DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 9

T903,023
PRINTING INK CONTAINING A LACTONE SOLVENT

Clarence S. Hunter, 1669 Lake Ave., Rochester, N.Y. 14615

Continuation of abandoned application Ser. No. 861,170, Sept. 25, 1969. This application Feb. 17, 1972, Ser. No. 227,255

Int. Cl. C09d *11/08, 11/10*
U.S. Cl. 106—22
No Drawing. 8 Pages Specification

A printing ink characterized by its rapid absorption by polymeric materials, and especially suited for printing on photographic film such as cellulose ester base film and on photographic paper having a polyolefin coating thereon. This printing ink comprises: (1) a colorant such as a dye and/or a pigment in an amount between 1 and 50% by weight; (2) a film-forming resinous binder such as a vinyl resin (e.g. polyvinyl acetate), a polycarbonate resin, a polyolefin resin or a cellulose ester (e.g. cellulose acetate, propionate, butyrate, nitrate, or acetate butyrate) in an amount between 1 and 20% by weight sufficient to dissolve said binder and render the ink spreadable; and (3) a solvent comprising 5–100% of a lactone of the formula:

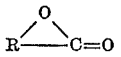

wherein R is an alkylene radical of 2–6 carbon atoms. Examples of suitable lactones are beta-propiolactone, 4-butyrolactone, 4-valerolactone, 6-hexanolactone and the like. The lactone may be employed as the sole solvent or it can be mixed in an amount of 5% or more with one or more conventional solvents such as methanol, ethanol, isopropanol, butanol, or pentanol; esters, such as ethyl acetate, butyl acetate, ethyl propionate; ethers, such as ethyl ether, propyl ether, butyl ether; and ketones such as acetone, methyl ethy ketone, 4-methyl-2-pentanone. The ink is exceptionally suitable for flexographic or rotatogravure pirnting, but it also can be used in ink stamp pads or in felt-tipped marking pens.